(12) United States Patent
Gruszka et al.

(10) Patent No.: US 11,817,126 B2
(45) Date of Patent: Nov. 14, 2023

(54) CONVERTING SIGN LANGUAGE

(71) Applicant: Micron Technology, Inc., Boise, ID (US)

(72) Inventors: Ariela E. Gruszka, Boise, ID (US); Angela S. Parekh, Boise, ID (US); Mandy W. Fortunati, Boise, ID (US); Teresa M. Di Dio, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/234,943

(22) Filed: Apr. 20, 2021

(65) Prior Publication Data

US 2022/0335971 A1 Oct. 20, 2022

(51) Int. Cl.
| | | |
|---|---|---|
| *G11B 27/031* | (2006.01) | |
| *G06F 3/04847* | (2022.01) | |
| *G06F 40/263* | (2020.01) | |
| *G06F 3/03* | (2006.01) | |
| *G10L 15/00* | (2013.01) | |
| *G09B 21/00* | (2006.01) | |
| *H04N 5/76* | (2006.01) | |
| *G06V 20/40* | (2022.01) | |

(Continued)

(52) U.S. Cl.
CPC .......... *G11B 27/031* (2013.01); *G06F 3/0304* (2013.01); *G06F 3/04847* (2013.01); *G06F 40/263* (2020.01); *G06V 20/40* (2022.01); *G06V 40/20* (2022.01); *G09B 21/009* (2013.01); *G10L 15/005* (2013.01); *H04N 5/76* (2013.01); *G06F 40/30* (2020.01)

(58) Field of Classification Search
CPC . G11B 27/031; G06F 3/0304; G06F 3/04847; G06F 40/263; G06F 40/30; G06V 20/40; G06V 40/20; G09B 21/009; G10L 15/005; H04N 5/76
See application file for complete search history.

(56) References Cited

U.S. PATENT DOCUMENTS

| | | |
|---|---|---|
| 7,333,507 B2 | 2/2008 | Bravin |
| 7,565,295 B1 | 7/2009 | Hernandez-Rebollar |

(Continued)

FOREIGN PATENT DOCUMENTS

| | | |
|---|---|---|
| CN | 109740447 | 5/2019 |

*Primary Examiner* — Girumsew Wendmagegn
(74) *Attorney, Agent, or Firm* — Brooks, Cameron & Huebsch, PLLC

(57) ABSTRACT

Methods and devices related to converting sign language are described. In an example, a method can include receiving, at a processing resource of a computing device via a radio of the computing device, first signaling including at least one of text data, audio data, or video data, or any combination thereof, converting, at the processing resource, at least one of the text data, the audio data, or the video data to data representing a sign language, generating, at the processing resource, different video data based at least in part on the data representing the sign language, wherein the different video data comprises instructions for display of a performance of the sign language, transmitting second signaling representing the different video data from the processing resource to a user interface, and displaying the performance of the sign language on the user interface in response to the user interface receiving the second signaling.

16 Claims, 3 Drawing Sheets

(51) Int. Cl.
    *G06V 40/20*     (2022.01)
    *G06F 40/30*     (2020.01)

(56) References Cited

U.S. PATENT DOCUMENTS

| | | |
|---|---|---|
| RE41,002 E | 11/2009 | Liebermann |
| 8,280,434 B2 | 10/2012 | Garg |
| 8,411,824 B2 | 4/2013 | Bucchieri et al. |
| 8,494,859 B2 | 7/2013 | Said |
| 9,282,377 B2 | 3/2016 | Bruner |
| 10,769,858 B2 | 9/2020 | Browy |
| 11,218,666 B1* | 1/2022 | Haas .................. G06V 40/28 |
| 2002/0111794 A1* | 8/2002 | Yamamoto ............ G10L 17/26 |
| | | 704/E15.041 |
| 2014/0171036 A1* | 6/2014 | Simmons ............ G09B 21/009 |
| | | 455/414.1 |
| 2017/0127115 A1* | 5/2017 | Lee .................... H04N 21/2362 |
| 2021/0160580 A1* | 5/2021 | Janugani ................ G10L 21/18 |

* cited by examiner

CONVERTING SIGN LANGUAGE

TECHNICAL FIELD

The present disclosure relates generally to converting sign language.

BACKGROUND

A computing device can be a smartphone, a wearable device, a tablet, a laptop, a desktop computer, or a smart assistant device, for example. The computing device can receive and/or transmit data and can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

Figure 1:
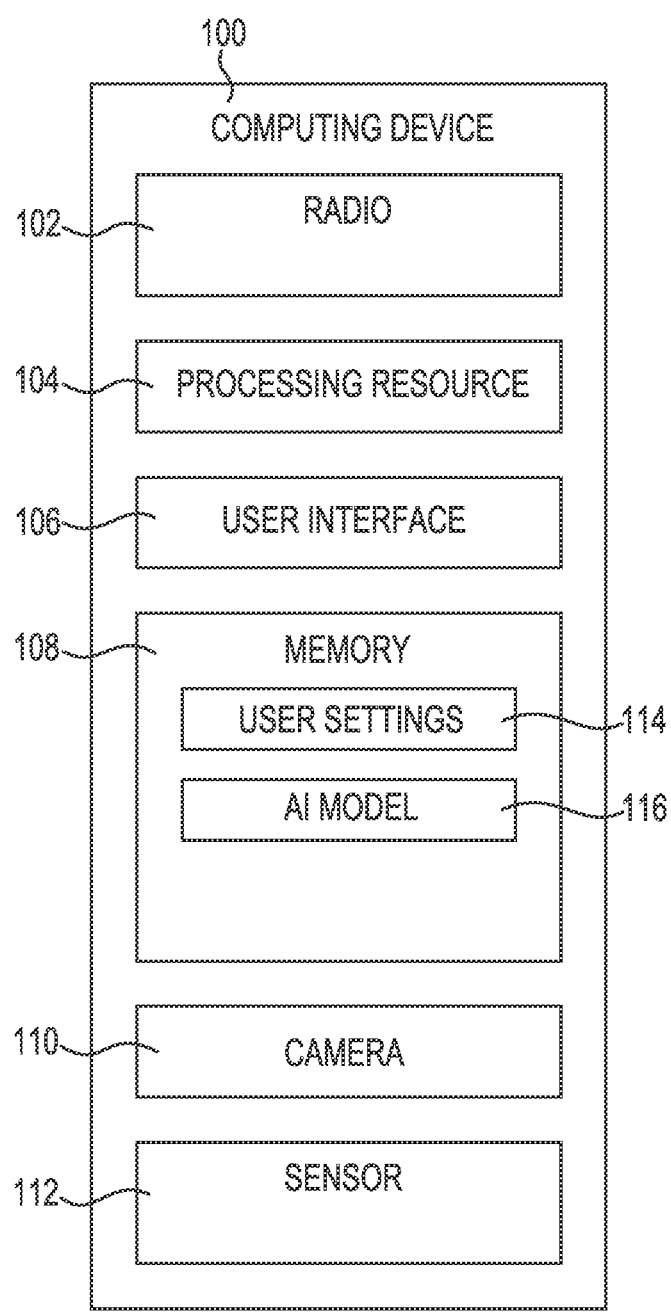
FIG. 1 illustrates an example of a computing device for converting sign language in accordance with a number of embodiments of the present disclosure.

The present disclosure includes methods and apparatuses related to receiving text data, audio data, and/or video data, converting the text data, the audio data, and/or the video data to data representing a sign language, and generating different video data based at least in part on the data representing the sign language. In some examples, the different video data can include instructions for display of a performance of the sign language on a user interface.

Often media platforms offer captioning, however, some in the deaf community, including pre-lingual deaf people, prefer sign language over captioning. Accordingly, displaying the performance of the sign language may be preferred by a user instead of or in combination with captioning.

There are over 100 different sign languages in the world and sign languages can differ based on countries and/or regions. Body language, facial expressions, and/or gestures can play a significant role in communicating in many sign languages. In some circumstances, captions are not able to accurately portray body language, facial expressions, and/or gestures. As such, the performance of sign language including body language, facial expressions, and/or gestures can be more accurate than captioning.

Similarly, converting sign language to text, audio, and/or video in another language can lack communication cues provided by the signer via body language, facial expressions, and/or gestures that may be particular to the signer and/or to the sign language. Detecting and incorporating these cues in text, audio, and/or video in another language can enable more accurate communication and less misinformation and/or misunderstandings.

An artificial intelligence (AI) model can be taught to accurately convert between sign language and another language. For example, the AI model can learn and interpret a user's language, vocal pitches, word choices, body language, facial expressions, and/or gestures and convey them to others. The AI model can also learn and interpret language, vocal pitches, word choices, body language, facial expressions, and/or gestures of others to accurately convey their communications to the user. In some examples, the text data, the audio data, and/or the video data can be converted to data representing a sign language and generate the different video data comprising the instructions for the display of the performance of the sign language in response to performing an AI operation on the text data, the audio data, and/or the video data.

As used herein, "a number of" something can refer to one or more of such things. A "plurality" of something intends two or more. The figures herein follow a numbering convention in which the first digit or digits correspond to the drawing figure number and the remaining digits identify an element or component in the drawing. Similar elements or components between different figures may be identified by the use of similar digits. For example, reference numeral 216 may reference element "16" in FIG. 2, and a similar element may be referenced as 316 in FIG. 3. In some instances, a plurality of similar, but functionally and/or structurally distinguishable, elements or components in the same figure or in different figures may be referenced sequentially with the same element number. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a computing device 100 for converting sign language in accordance with a number of embodiments of the present disclosure. The computing device 100 can be, but is not limited to, a smartphone, a wearable device, a tablet, a laptop, a desktop computer, a smart assistant device, a television, or any combination thereof.

A radio 102, processing resource 104, user interface 106, memory 108, camera 110, and/or sensor 112 can be included in and/or coupled to the computing device 100. The computing device 100 can receive and/or transmit data via wired and/or wireless transmissions using a communication device (e.g., intermediary device), such as, but not limited to a radio 102. The radio 102 through signaling (e.g., radio signals) and/or a network relationship can enable the computing device 100 to communicate with one or more other computing devices, wearable devices, telephones, sensors, smart assistants, and/or cloud computing devices. Examples of such a network relationship can include Bluetooth, AirDrop, a peer-to-peer Wi-Fi network, a cellular network, a distributed computing environment (e.g., a cloud computing environment), a wide area network (WAN) such as the Internet, a local area network (LAN), a personal area network (PAN), a campus area network (CAN), or metropolitan area network (MAN), among other types of network relationships.

The memory 108 can include volatile and/or non-volatile memory, for instance, DRAM, NAND, and/or 3D Crosspoint. The memory 108 can be coupled to the processing resource 104 and can store user settings 114 and an AI model 116. The memory 108 can be any type of storage medium that can be accessed by the processing resource 104 to perform various examples of the present disclosure. For example, the memory 108 can be a non-transitory computer readable medium having computer readable instructions (e.g., computer program instructions) stored thereon that are executable by the processing resource 104 to receive, at the processing resource 104 of the computing device 100 via the radio 102 of the computing device 100, first signaling including at least one of text data, audio data, video data, or any combination thereof, convert, at the processing resource 104, at least one of the text data, the audio data, or the video data, or any combination thereof, to data representing a sign language, generate, at the processing resource 104, different video data based at least in part on the data representing the sign language, wherein the different video data comprises instructions for display of a performance of the sign language, transmit second signaling representing the different video data from the processing resource 104 to the user interface 106, and display the performance of the sign language on the user interface 106 in response to the user interface 106 receiving the second signaling.

In some examples, the text data, the audio data, and/or the video data and the different video data including the performance of the sign language can be displayed simultaneously on the user interface 106. The performance of the sign language can be performed by one or more avatars (e.g., deepfakes). The one or more avatars can include famous people, characters, the user of the computing device 100, or known associates (e.g., family, friends, coworkers, acquaintances) of the user. For example, if a friend sent text data to the user, the friend can be the avatar signing the message to the user on the user interface 106. In some examples, the user can be watching a video (e.g., a movie, a television show, and/or a video clip) and one or more avatars can be included in the corner of the screen. For example, when an actress in a movie is speaking, an avatar of the actress can be displayed signing what she is saying to the user on the user interface 106. When the actress is no longer speaking, the avatar of the actress can be removed from the user interface 106. In some examples, multiple avatars corresponding to their respective characters can be performing sign language when there are multiple characters in a scene.

The user interface 106 can be generated by computing device 100 in response to receiving signaling from the processing resource 104. The user interface 106 can be a graphical user interface (GUI) that can provide and/or receive information to and/or from the user of the computing device 100. In a number of embodiments, the user interface 106 can be shown on a television and/or a display and/or hologram of the computing device 100.

A user can receive data and/or transmit selections (e.g., commands) via the user interface 106. For example, the user interface 106 can display a number of options and the user interface 106 can receive a selection of one or more of the number of options in response to the user selecting the one or more options on the user interface 106. In some examples, the user interface 106 can receive an input of user settings 114 and/or a selection of user settings 114 and the user interface 106 can transmit signaling including data representing the user settings 114 to the processing resource 104. In a number of embodiments, the camera 110 can receive the user settings 114 in sign language and transmit signaling including the data representing the user settings 114 to the processing resource 104. The camera 110 can be a photo camera, a video camera, and/or an image sensor and can take photos and/or videos.

User settings 114 can also be derived from sensor data from sensor 112. The sensor data can be transmitted from the sensor 112 to the processing resource 104 and the processing resource 104 can generate the data representing the user settings 114 based at least in part on the sensor data. For example, a location of the computing device 100 can be determined in response to the sensor being a global position system (GPS). If the sensor data from sensor 112 transmits location data indicating the computing device 100 is in the United States, the processing resource 104 can determine that the language setting should be programmed to English in the user settings 114, for example.

In some examples, the user settings 114 can be stored in memory 108 in response to the processing resource 104 receiving the user settings 114. Instructions for the computing device 100 can be created and executed based on the user settings 114. For example, the processing resource 104 can generate the different video data based at least in part on the data representing the user settings 114.

The computing device 100 can receive, via radio 102, signaling including sensor data from a different computing device. The processing resource 104 can generate the different video data based at least in part on the sensor data from the different computing device. For example, a heartrate of a different user of the different computing device can be determined in response to the sensor from the different computing device being a heartrate monitor. If the sensor from the different computing device transmits the heartrate of the different user with the text data, audio data, and/or video data to computing device 100, the processing resource 104 can determine that the different user is anxious. In a number of embodiments, the processing resource 104 can generate the different video data based in part on the sensor data representing the anxiety of the different user and provide instructions to display the anxiety of the different user in the different video.

Video data of a user can be received via the camera 110 and transmitted to the processing resource 104. The processing resource 104 can generate the different video data based at least in part on the video data of the user. For example, the performance of the sign language can use sign language, body language, facial expressions, and/or gestures of the user to make the communication clear and easy for the user to understand.

In a number of embodiments, the processing resource 104 can convert received text data, audio data, and/or video data to data representing body language, facial expressions, and/or gestures. The processing resource 104 can generate the different video data based at least in part on the data representing the body language, facial expressions, and/or gestures and the different video can comprise instructions for display of the body language, facial expressions, and/or gestures.

In some examples, the processing resource 104 can receive, via the camera 110, signaling representing video data including a letter, a word, a phrase, a sentence, and/or a statement in a sign language from a user of computing device 100. The processing resource 104 can convert the video data to text data, audio data, and/or different video data in a particular language.

The processing resource 104 can transmit, via the radio 102, signaling including the text data, audio data, and/or video data. In a number of embodiments, the signaling representing the video data can include body language, gestures, and/or facial expressions. The text data, audio data, and/or different video data can be based at least in part on the video data. For example, the audio data can include a vocal pitch based on the video data.

In a number of embodiments, the processing resource 104 can receive signaling representing text data, audio data, and/or video data from a different computing device and determine the particular language the text data, audio data, and/or video data is in. The processing resource 104 can receive video data of a user of the computing device 100 signing and convert the video data of the user of the computing device 100 signing to text data, audio data, and/or different video data in the particular language the message from the different computing device was in. For example, the computing device 100 can receive a message from a different computing device, determine the language the message is in, and transmit a response to the different computing device in the same language as the received message.

The processing resource 104 can include components configured to enable the computing device 100 to perform AI operations. In some examples, AI operations may include training operations or inference operations, or both. In a number of embodiments, the AI model 116 can be trained remotely in a cloud using sample data and transmitted to the computing device 100 and/or trained on the computing device 100. In some examples, the different video data can be generated by performing an AI operation on the data representing the sign language using the AI model 116.

Figure 2:
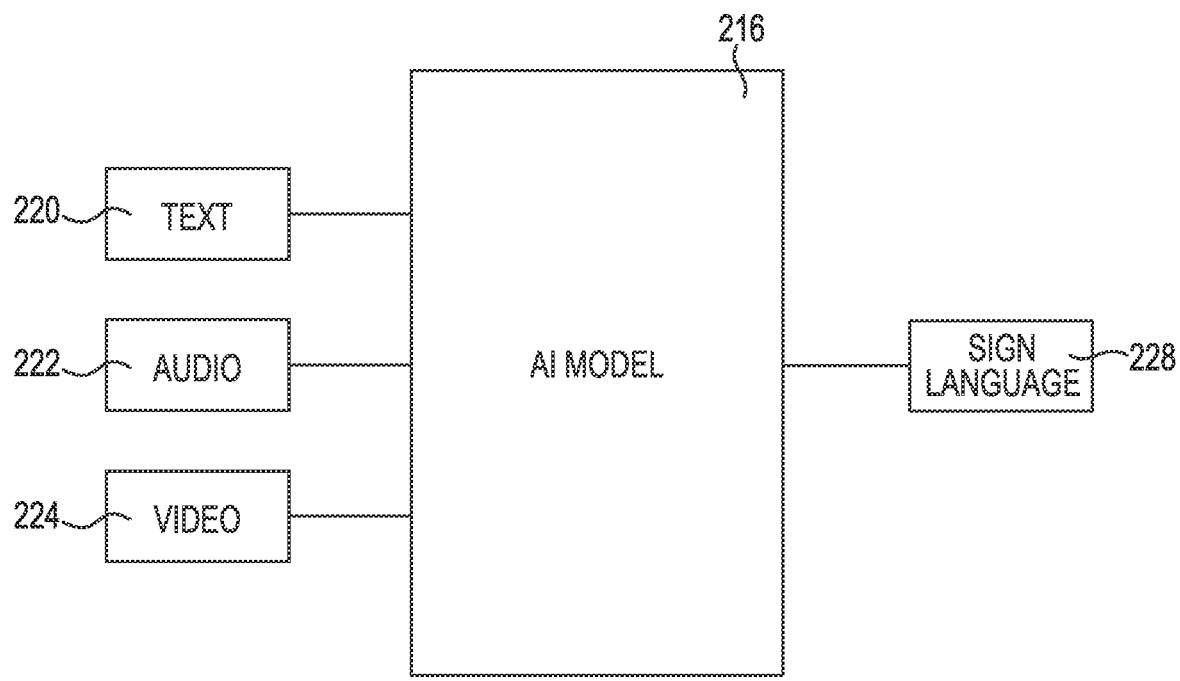
FIG. 2 illustrates an example of a flow diagram for converting sign language using an AI model in accordance with a number of embodiments of the present disclosure.

FIG. 2 illustrates an example of a flow diagram for converting sign language using an AI model 216 in accordance with a number of embodiments of the present disclosure. AI model 216 can correspond to AI model 116 in FIG. 1. The AI model 216 can receive text 220, audio 222, and/or video 224 and convert the text 220, audio 222, and/or video 224 to sign language 228 (e.g., different video). In some examples the AI model 216 can receive sign language 228 by a camera (e.g., camera 110 in FIG. 1) recording a user signing, for example, and convert the sign language 228 to text 220, audio 222, and/or video 224.

Text data 220 can include a number of letters, numbers, characters, abbreviations, acronyms, words, slang words, phrases, sayings, sentences, quotes, and/or punctuations. Use of the number of letters, numbers, characters, abbreviations, acronyms, words, slang words, phrases, sayings, sentences, quotes, and/or punctuations can have different meanings depending on the context, writer, language of the writer, location of the writer, and/or origin of the writer, for example. The AI model 216 can analyze the text data 220 based on the context, writer, language of the writer, location of the writer, and/or origin of the writer, and determine the meaning of the text data 220. The meaning of the text data 220 can be translated into sign language 228 using hand signals, body language, gestures, and/or facial expressions.

Audio data 222 can include a number of sounds, pauses, vocal pitches, vocal tones, vocal notes, letters, numbers, characters, abbreviations, acronyms, words, slang words, phrases, sayings, sentences, and/or quotes. Use of the number of sounds, pauses, vocal pitches, vocal tones, vocal notes, letters, numbers, characters, abbreviations, acronyms, words, slang words, phrases, sayings, sentences, and/or quotes can have different meanings depending on the context, speaker, language of the speaker, location of the speaker, and/or origin of the speaker, for example. The AI model 216 can analyze the audio data 222 based on the context, speaker, language of the speaker, location of the speaker, and/or origin of the speaker and determine the meaning of the audio data 222. The meaning of the audio data 222 can be translated into sign language 228 using hand signals, body language, gestures, and/or facial expressions.

Video data 224 can include a number of sounds, pauses, vocal pitches, vocal tones, vocal notes, letters, numbers, characters, abbreviations, acronyms, words, slang words, phrases, sayings, sentences, quotes, hand signals, gestures, body language, and/or facial expressions. Use of the number of sounds, pauses, vocal pitches, vocal tones, vocal notes, letters, numbers, characters, abbreviations, acronyms, words, slang words, phrases, sayings, sentences, quotes, hand signals, gestures, body language, and/or facial expressions can have different meanings depending on the context, performer, language of the performer, location of the performer, and/or origin of the performer, for example. The AI model 216 can analyze the video data 224 based on the context, performer, language of the performer, location of the performer, and/or origin of the performer and determine the meaning of the video data 224. The meaning of the video data 224 can be translated into sign language 228 using hand signals, body language, gestures, and/or facial expressions.

Use of a number of hand signals, gestures, body language, and/or facial expressions while performing sign language 228 can have different meanings depending on context, the performer, location of the performer, and/or origin of the performer. The AI model 216 can analyze the sign language 228 based on the context, performer, location of the performer, and/or origin of the performer and determine the meaning of the sign language 228. The meaning of the sign language 228, including the meaning of the body language, gestures, and/or facial expressions, can be translated into text data 220, audio data 222, and/or video data 224.

Figure 3:
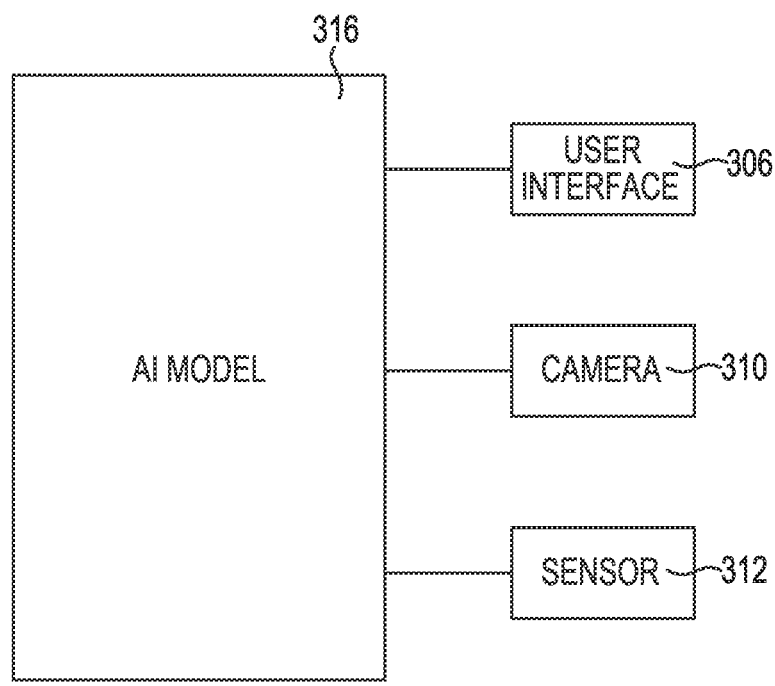
FIG. 3 illustrates an example flow diagram for teaching an AI model to convert sign language in accordance with a number of embodiments of the present disclosure.

FIG. 3 illustrates an example flow diagram for teaching an AI model 316 to convert sign language in accordance with a number of embodiments of the present disclosure. AI model 316 can correspond to AI model 116 in FIG. 1 and/or AI model 216 in FIG. 2.

Prior to converting the sign language to text data, voice data, and/or video data or converting text data, voice data, and/or video data to a different sign language, the AI model 316 can be trained on and/or off the computing device (e.g., computing device 100 in FIG. 1). The AI model 316 can be trained to identify and interpret sounds, pauses, vocal pitches, vocal tones, vocal notes, letters, numbers, characters, abbreviations, acronyms, words, slang words, phrases, sayings, sentences, quotes, hand signals, gestures, body language, and/or facial expressions and translate them to text data, audio data, and/or video data in the same or a different language.

The AI model 316 can receive data for training. In some examples, translation data (e.g., text to speech and/or speech to text data) can be inputted into the AI model 316 and used to train the AI model 316. Data can be received from user interface 306, camera 310, and/or sensor 312 corresponding to user interface 106, camera 110, and/or sensor 112 in FIG. 1, respectively. This data can be inputted into the AI model 316 and used to train the AI model 316 to be customized to the user.

For example, an image can be displayed on the user interface 306. In response to displaying the image on the user interface 306, signaling representing video data can be received via the camera 310. The video data can include a letter, word, phrase, sentence, and/or statement in a sign language. In some examples, the video data and the data representing the image can be stored in memory (e.g., memory 108 in FIG. 1). The video data and the data representing the image can be inputted into the AI model 316 to train the AI model 316. For example, the AI model 316 can transmit a command including an image to the user interface 306 to display the image on the user interface 306. The image can be an image of a dog, for example. A user can sign the word "dog" in their preferred sign language and the camera 310 can record and transmit the video data to the AI model 316. The AI model 316 can match the image of the dog with its corresponding sign provided by the user. In some examples, the AI model 316 may be able to determine which sign language the user is using by searching for the hand signal provided for the word "dog" by the user in a library of signs.

In response to the AI model 316 receiving text data, audio data, or video data including the word "dog", the AI model 316 can generate video data comprising instructions for display of a performance of sign language including body language, gestures, and/or facial expressions associated with the word "dog". In response to the AI model 316 receiving video data including sign language of the word "dog", the AI model 316 can generate text data, audio data, and/or video data corresponding to the word "dog".

In some examples, user settings (e.g., user settings 114 in FIG. 1) and/or sensor data can be inputted into the AI model 316 and used to train the AI model 316. As previously described in connection with FIG. 1, the user interface 306 and/or the camera 310 can receive user settings. The user settings can determine which language text data, audio data, and/or video data is converted to, for example. User settings can also be derived from sensor data. The sensor data can be from one or more computing devices.

For example, the AI model 316 can receive a location of a user of a computing device in Germany when the sensor is a global position system (GPS) and determine the user's language is German. Accordingly, the AI model 316 can translate received text data, audio data, and/or video data from a different computing device to German and display the received text data, audio data, and/or video data in German. In some examples, the different computing device can transmit sensor data, for example, a location of a user of the different computing device in France to the computing device. Accordingly, the AI model 316 can translate text data, audio data, and/or video data created by the user of the computing device to French and transmit the translated text data, audio, and/or video data to the different computing device.

Figure 4:
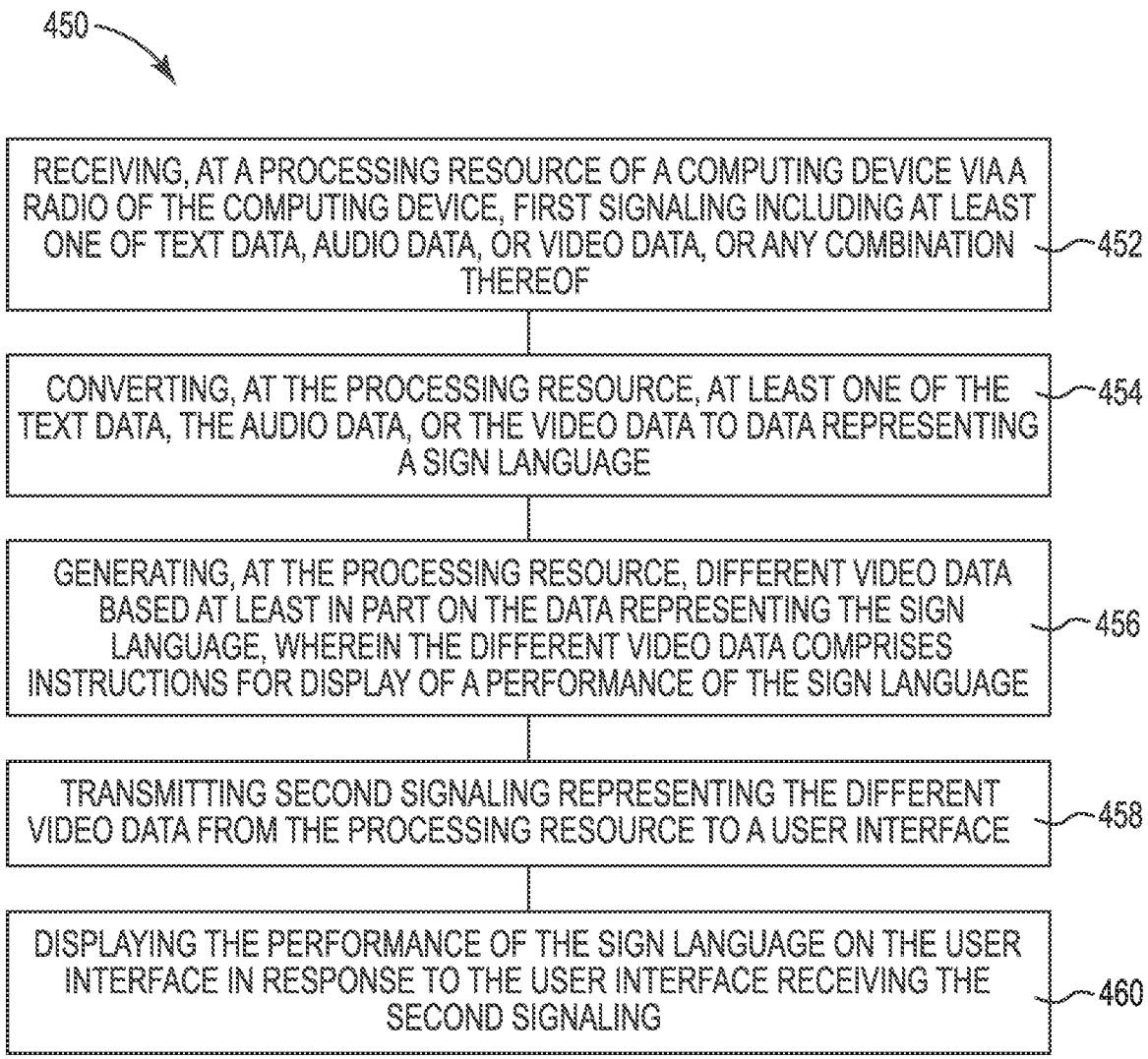
FIG. 4 is a flow diagram of a method for converting sign language in accordance with a number of embodiments of the present disclosure.

FIG. 4 is a flow diagram of a method 450 for converting sign language in accordance with a number of embodiments of the present disclosure. At block 452, the method 450 can include receiving, at a processing resource of a computing device via a radio of the computing device, first signaling including at least one of text data, audio data, or video data, or any combination thereof. The computing device can receive and/or transmit data via a radio. The radio can communicate via a network relationship through which the computing device communicates with one or more other computing devices, wearable devices, telephones, sensors, smart assistants, and/or cloud computing devices.

At block 454, the method 450 can include converting, at the processing resource, at least one of the text data, the audio data, or the video data to data representing a sign language. In some examples, natural language processing (NLP) can be used for converting the text data, audio data, and/or video data to data representing the sign language.

At block 456, the method 450 can include generating, at the processing resource, different video data based at least in part on the data representing the sign language, wherein the different video data comprises instructions for display of a performance of the sign language. The performance of the sign language can be performed by one or more avatars.

At block 458, the method 450 can include transmitting second signaling representing the different video data from the processing resource to a user interface. The user interface can be generated by the computing device in response to receiving signaling from the processing resource.

At block 460, the method 450 can include displaying the performance of the sign language on the user interface in response to the user interface receiving the second signaling. In a number of embodiments, the text data, the audio data, and/or the video data and the different video data can be simultaneously displayed on the user interface.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A method, comprising:
receiving, at a processing resource of a computing device via a radio of the computing device, first signaling including at least one of text data, audio data, or video data, or any combination thereof and second signaling including sensor data from a different computing device;
converting, at the processing resource, at least one of the text data, the audio data, or the video data to data representing a sign language and a facial expression;
generating, at the processing resource, different video data by performing an artificial intelligence (AI) operation at least in part on the data representing the sign language, the facial expression, and the sensor data included in the second signaling using an AI model, wherein the different video data comprises instructions for display of a performance of the sign language and the facial expression;

transmitting third signaling representing the different video data from the processing resource to a user interface; and displaying the performance of the sign language and the facial expression on the user interface in response to the user interface receiving the third signaling.

2. The method of claim 1, further comprising displaying at least one of the text data, the audio data, or the video data, or any combination thereof, and the different video data including the performance of the sign language simultaneously on the user interface.

3. The method of claim 1, further comprising:
receiving, at the processing resource, fourth signaling including data representing user settings; and
generating, at the processing resource, the different video data based at least in part on the data representing the user settings.

4. The method of claim 3, further comprising:
receiving, via a camera, data representing the user settings in sign language; and
transmitting the fourth signaling including the data representing the user settings from the camera to the processing resource.

5. The method of claim 3, further comprising:
receiving a selection of the user settings on the user interface; and
transmitting the fourth signaling including the data representing the user settings from the user interface to the processing resource.

6. The method of claim 1, further comprising:
receiving, via the camera, fourth signaling including video data of a user; and
generating, at the processing resource, the different video data based at least in part on the video data of the user.

7. An apparatus, comprising:
a camera;
a radio; and
a processing resource coupled to the camera, and the radio, wherein the processing resource is configured to:
receive, via the camera, first signaling including data representing user settings;
receive, via the camera, second signaling representing video data including at least one of a letter, a word, a phrase, a sentence, or a statement, or any combination thereof, in a sign language;
convert the video data to at least one of text data, audio data, or different video data, or any combination thereof based at least in part on the data representing the user settings; and
transmit, via the radio, third signaling including at least one of the text data, the audio data, or the different video data, or any combination thereof.

8. The apparatus of claim 7, wherein the second signaling representing the video data includes at least one of body language, gestures, or facial expressions, or any combination thereof.

9. The apparatus of claim 7, wherein the audio data includes a vocal pitch based at least in part on the video data.

10. The apparatus of claim 7, wherein the processing resource is configured to convert the video data to at least one of the text data, the audio data, or the different video data, or any combination thereof, in a particular language.

11. The apparatus of claim 10, wherein the processing resource is configured to:
receive fourth signaling representing a message;
determine the particular language the message is in; and
convert the video data to at least one of the text data, the audio data, or the different video data, or any combination thereof, in the particular language in response to determining the particular language the message is in.

12. An apparatus, comprising:
a memory;
a user interface;
a radio;
a camera; and
a processing resource coupled to the memory, the user interface, the radio, and the camera, wherein the processing resource is configured to:
display an image on the user interface;
receive, via the camera, first signaling representing video data including at least one of a letter, a word, a phrase, a sentence, or a statement, or any combination thereof, in a sign language in response to displaying the image on the user interface;
store the video data and data representing the image in the memory;
train an artificial intelligence (AI) model by inputting the video data and the data representing the image into the AI model;
receive, at the processing resource via the radio, second signaling including at least one of text data, audio data, or video data, or any combination thereof;
generate video data, wherein the video data comprises instructions for display of a performance of at least one of the text data, the audio data, or the video data, or any combination thereof, in sign language by inputting at least one of the text data, the audio data, or the video data, or any combination thereof, into the AI model; and
display, on the user interface, the video data.

13. The apparatus of claim 12, wherein the user interface is shown on at least one of a display or a hologram, or any combination thereof.

14. The apparatus of claim 12, wherein the video data comprises instructions for display of a performance of at least one of body language, gestures, or facial expressions, or any combination thereof.

15. The apparatus of claim 12, wherein the processing resource is configured to train the AI model by inputting user settings.

16. The apparatus of claim 12, wherein the processing resource is configured to train the AI model by inputting sensor data.

* * * * *